(12) United States Patent
Shih

(10) Patent No.: US 6,684,448 B2
(45) Date of Patent: Feb. 3, 2004

(54) AUTOMATIC PROP-UP DEVICE OF WINDSHIELD WIPER

(75) Inventor: Simon Shih, Changhua (TW)

(73) Assignee: So Ton Automotive Accessories Co., Ltd., Changhua (TW)

(*) Notice: Subject to any disclaimer, the term of this patent is extended or adjusted under 35 U.S.C. 154(b) by 0 days.

(21) Appl. No.: 10/158,939

(22) Filed: Jun. 3, 2002

(65) Prior Publication Data

US 2003/0221275 A1 Dec. 4, 2003

(51) Int. Cl.[7] ............................... B60S 1/04; B60S 1/32
(52) U.S. Cl. ................ 15/250.19; 15/250.001
(58) Field of Search .............. 15/250.001, 250.19, 15/250.351, 250.16

(56) References Cited

FOREIGN PATENT DOCUMENTS

| DE | 3226258 | * | 1/1984 | ............ 15/250.19 |
| DE | 3325707 | * | 1/1985 | ............ 15/250.19 |
| JP | 1-249549 | * | 10/1989 | ............ 15/250.19 |

* cited by examiner

Primary Examiner—Gary K. Graham
(74) Attorney, Agent, or Firm—Rosenberg, Klein & Lee

(57) ABSTRACT

The present invention relates to an automatic prop-up device of windshield wiper, which includes a roller device at where the supporting pole of vehicle windshield wiper located and a wedge device at the lower rim of vehicle windshield glass or at the air ventilation panel where the windshield glass adjoining the hood, corresponding to the location of the roller device. When the windshield wiper swings to the near lowest position, it brings the roller device to make opposite movement against the wedge device, so when the roller device moves upwards along the wedge device to prop up the supporting pole of windshield wiper, the scrapping rubber strip of windshield wiper is prop up correspondingly so that the scrapping rubber strip and the windshield glass are separated and not tightly against each other.

1 Claim, 6 Drawing Sheets

AUTOMATIC PROP-UP DEVICE OF WINDSHIELD WIPER

BACKGROUND OF THE INVENTION (1) Field of the Invention

The present invention relates to an automatic prop-up device of windshield wiper, which includes correspondingly a roller device and a wedge device at where the supporting pole of vehicle windshield wiper located, the lower rim of vehicle windshield glass, or the air ventilation panel where the windshield glass adjoining the hood. When the windshield wiper swings to the near lowest position, it brings the roller device to make opposite movement against the wedge device, so when the roller device moves upwards along the wedge device to prop up the supporting pole of windshield wiper and its scrapping rubber strip as well to separate the scrapping rubber strip from the windshield glass and not tightly against each other in order to prolong the usage life of the crapping rubber strip of windshield wiper.

(2) Description of the Prior Art

Generally, ordinary windshield wiper of a vehicle is only turned on while encounters rain or snow. In other words, for the most of the time, the windshield wiper sits idly at the lower rim of the windshield glass, so, after under a long period of sunshine and high heat or freezing weather with low temperature, the rubber strip of windshield wiper often sticks onto the windshield glass due to high heat or freeze. Especially when the vehicle is parked outdoors, the dusts in the air tend to accumulate on the lower rim of the windshield glass, and once the windshield wiper is turned on, the rubber strip of the windshield wiper can be damaged due to the reasons stated before. Therefore, the industry has developed a prop-up device of vehicle windshield wiper 6, as shown in FIG. 5 and FIG. 6, mainly comprising a fixed base 61, a rotating base 62 that is hinged onto the fixed base and rotatable, and a top pole 63 that is hinged onto the rotating base 62 and rotatable, wherein a position trough 611 is formed on the fixed base 61 to allow a clamping piece 64 locked onto the supporting pole of windshield wiper 65. Its characteristics may include: the top of the fixed base 61 is concave and forms a accommodation trough 612 to accommodate the rotating base 62 and inside the accommodation trough 612 further includes a tenon block 613; on top of the rotating base 62 includes an opening 621, so when the rotating base 62 is placed inside the accommodation trough 612, the tenon block 613 is placed precisely inside the opening 621; there are separate twist resilient elements S1, S2 at where the rotating base 62 is hinged onto the fixed base 61 and the top pole 63 is hinged onto the rotating base 62, so the rotating base 62 can be swung by external forces and back to folded state through the twist resilient elements S1, S2 when the external forces disappear; in addition, on one end of the top pole 63 further includes a stopping block 631 and the top pole 63 rotates to an upright position by the use of inserting the stopping block 631 into the opening 621 and being stopped by the stopping block 613.

Although at the beginning of the prior vehicle windshield being turned on and starting to swing, the rotating base of the prop-up device of windshield wiper can automatically fold the top pole structure through the resilient effect generated by twist resilience, so the top pole does not support against the surface of the windshield glass 4 and the rubber strip of windshield wiper can be tightly against onto the windshield glass to perform the intended function of expelling rain. However, after the prior windshield wiper finishes swinging, it requires manual power to rotate the top pole of the prop-up device of windshield wiper to the upright state, so the top pole structure supports against the windshield glass again and props up the rubber strip of windshield wiper to separate from the surface of the windshield glass.

SUMMARY OF THE INVENTION

The present invention relates to the automatic prop-up device of windshield wiper, which includes correspondingly a roller device and a wedge device at the near lowest position of the windshield wiper swinging. By the way of the roller device making opposite movement against the wedge device to prop up the scrapping rubber strip of windshield wiper, when the windshield wiper swings to the lowest position or stops swinging, and separate from the windshield glass in order to prolong the usage life of the scrapping rubber strip of windshield wiper.

The primary objective of the present invention is to provide an automatic prop-up device of windshield wiper that is able to prop up the windshield wiper so that it is separated from the windshield glass before the windshield wiper is turned on in order to prolong the usage life of windshield wiper.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an automatic prop-up device of windshield wiper. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
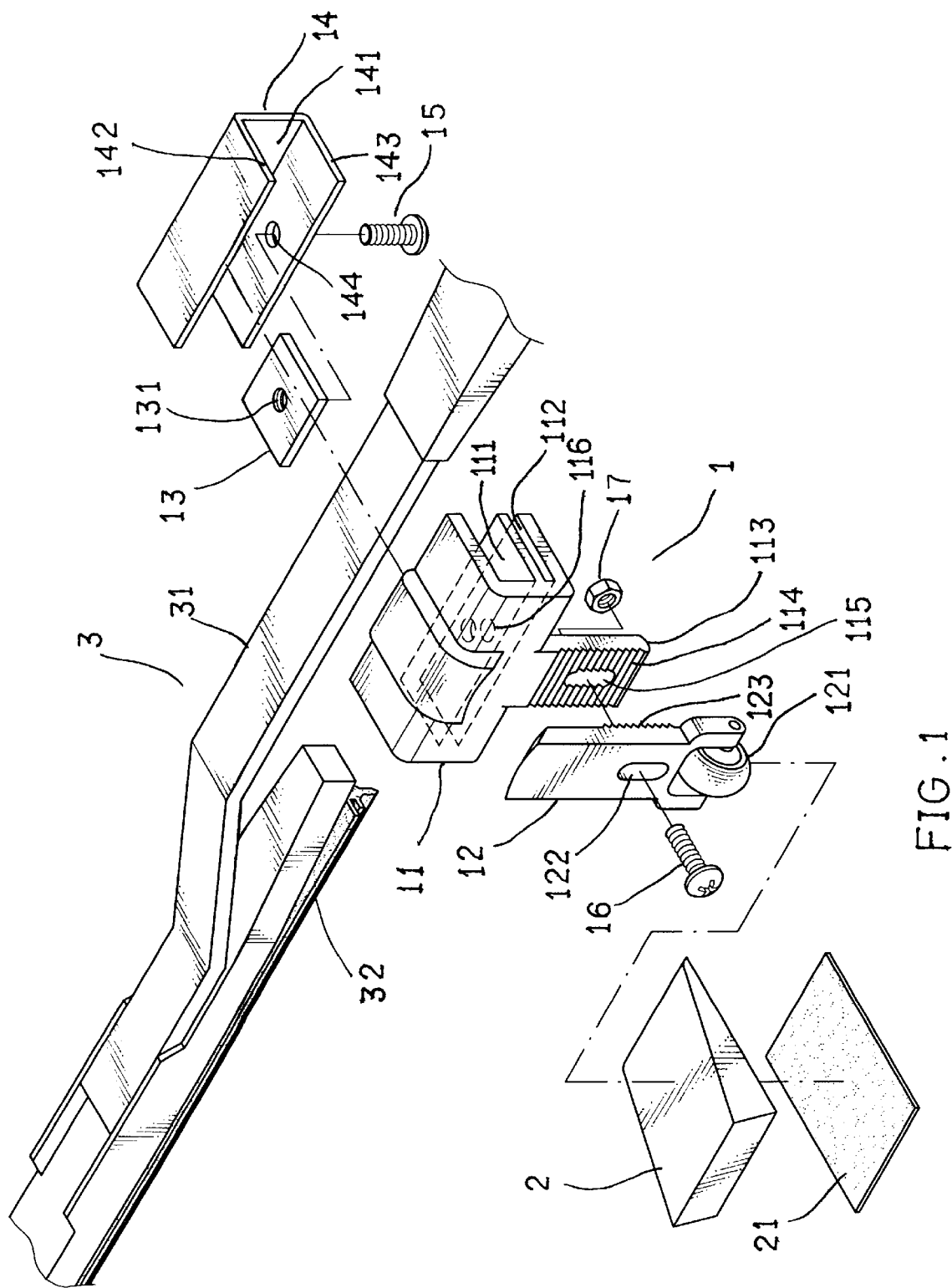
FIG. 1 is a schematic 3-dimentional explosion view of a preferred embodiment in accordance with the present invention.
Figure 2:
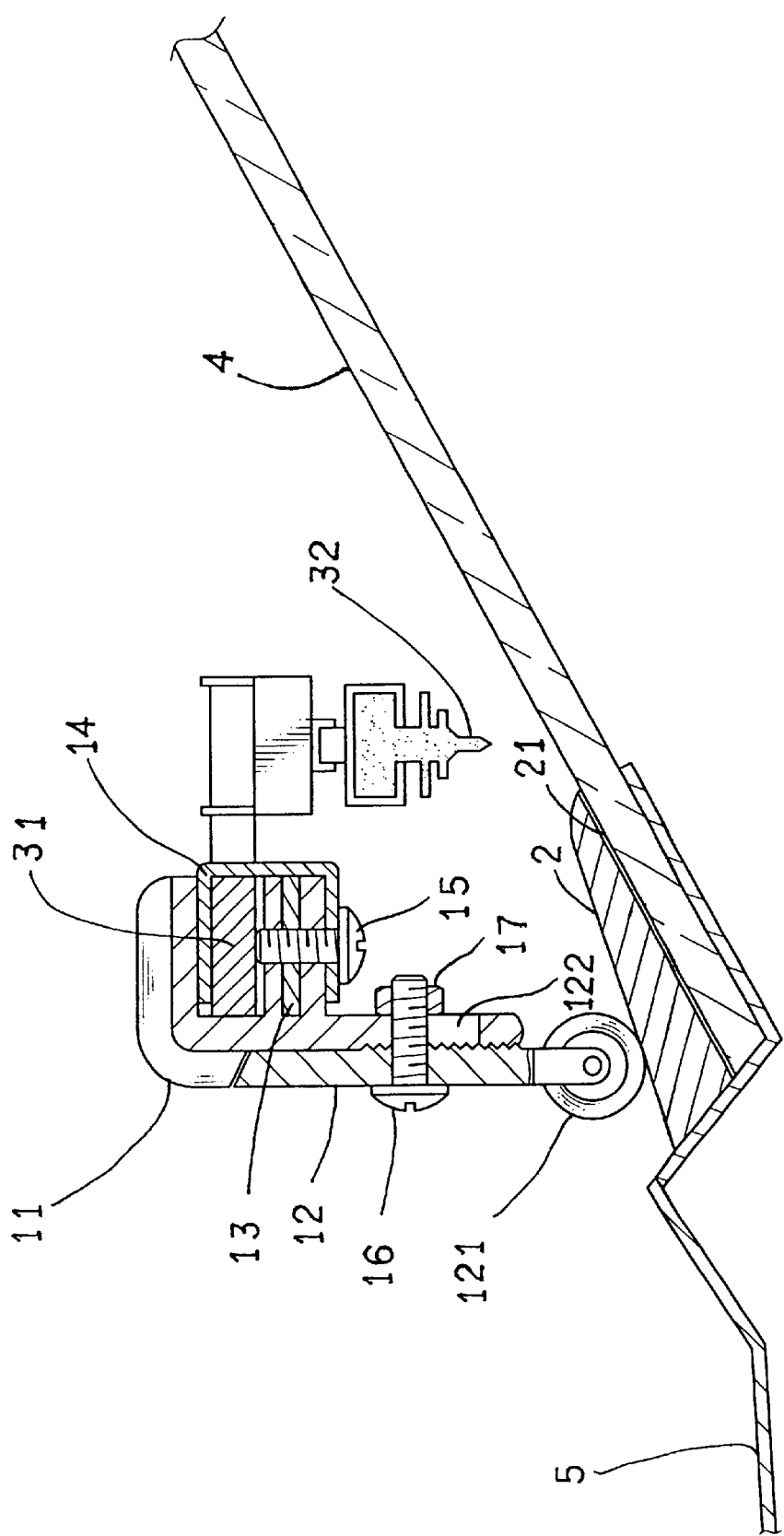
FIG. 2 is a schematic side cross-section view (1) of a preferred embodiment in use in accordance with the present invention.
Figure 3:
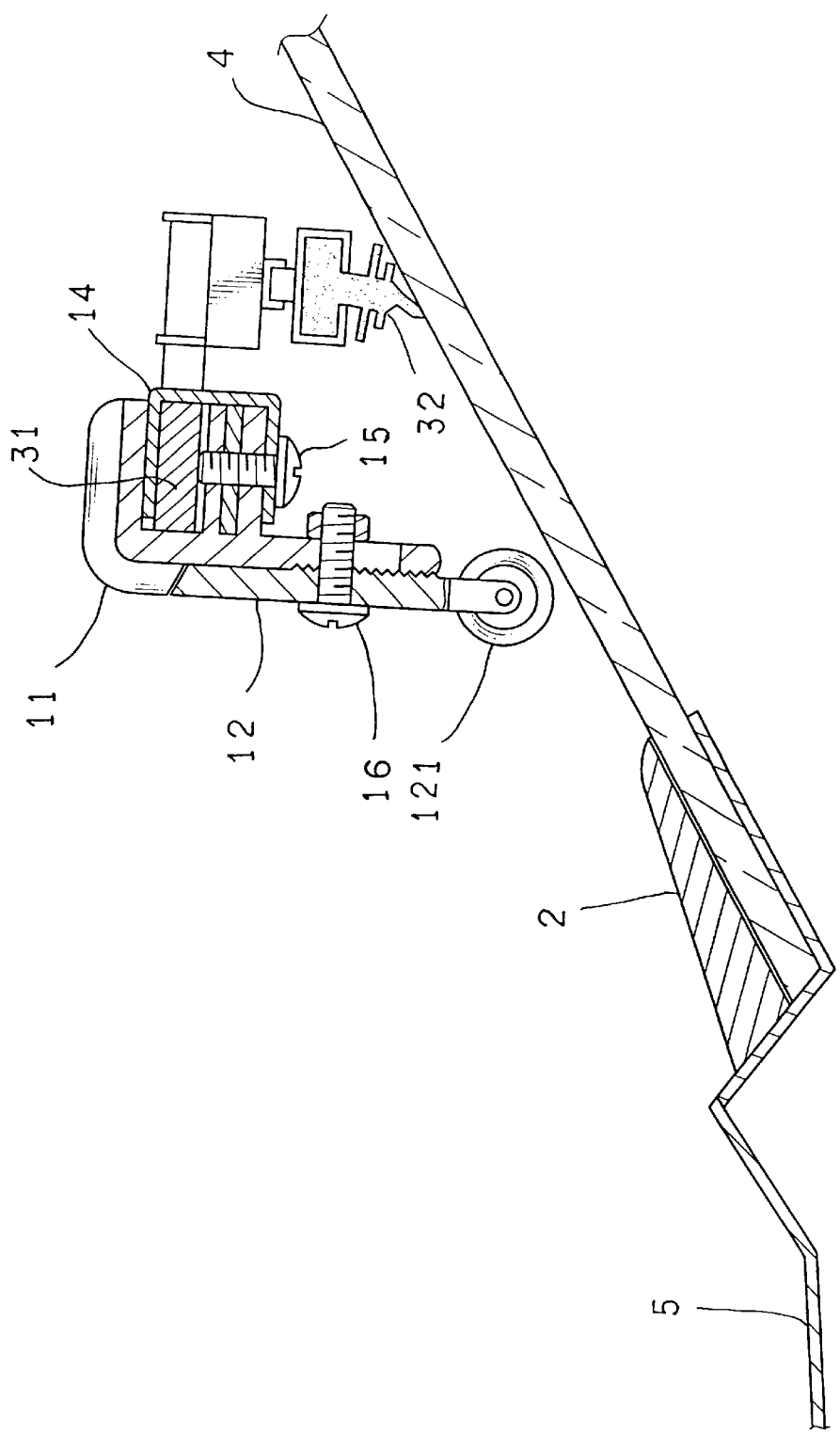
FIG. 3 is a schematic side cross-section view (2) of a preferred embodiment in use in accordance with the present invention.
Figure 4:
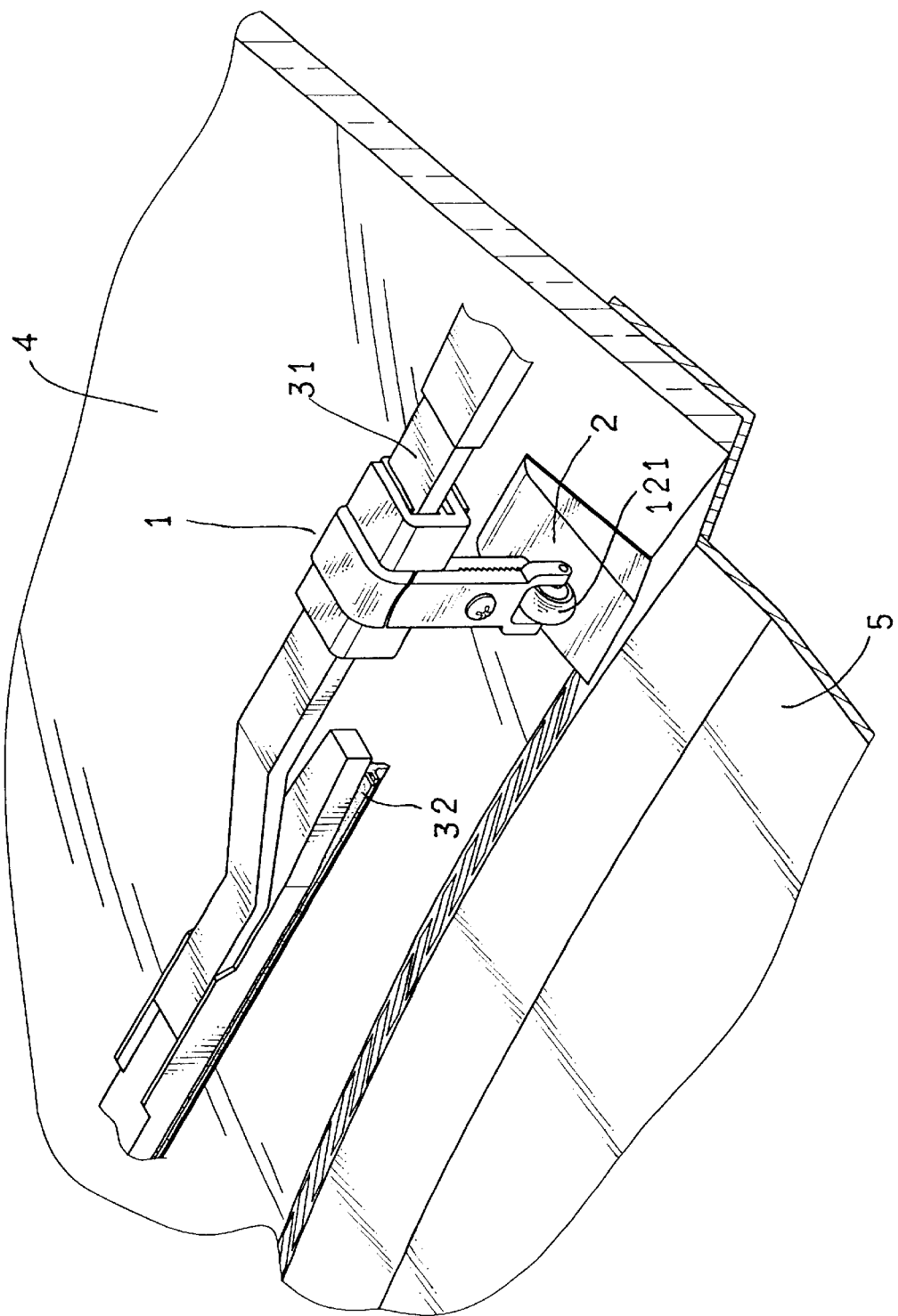
FIG. 4 is a schematic 3-dimentional view of a preferred embodiment in accordance with the present invention.
Figure 5:
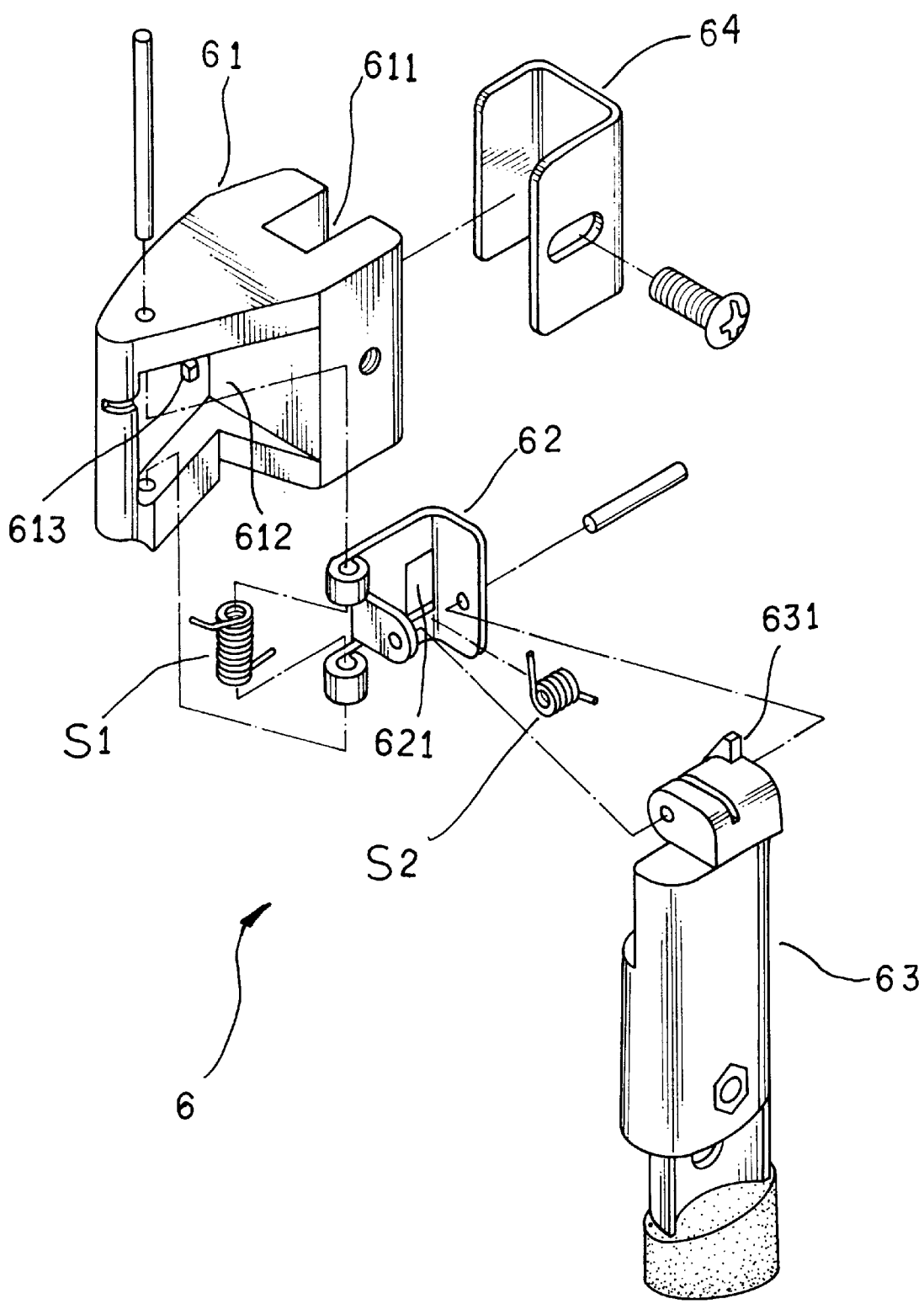
FIG. 5 is a schematic 3-dimentional explosion view of a prior prop-up device of windshield wiper.
Figure 6:
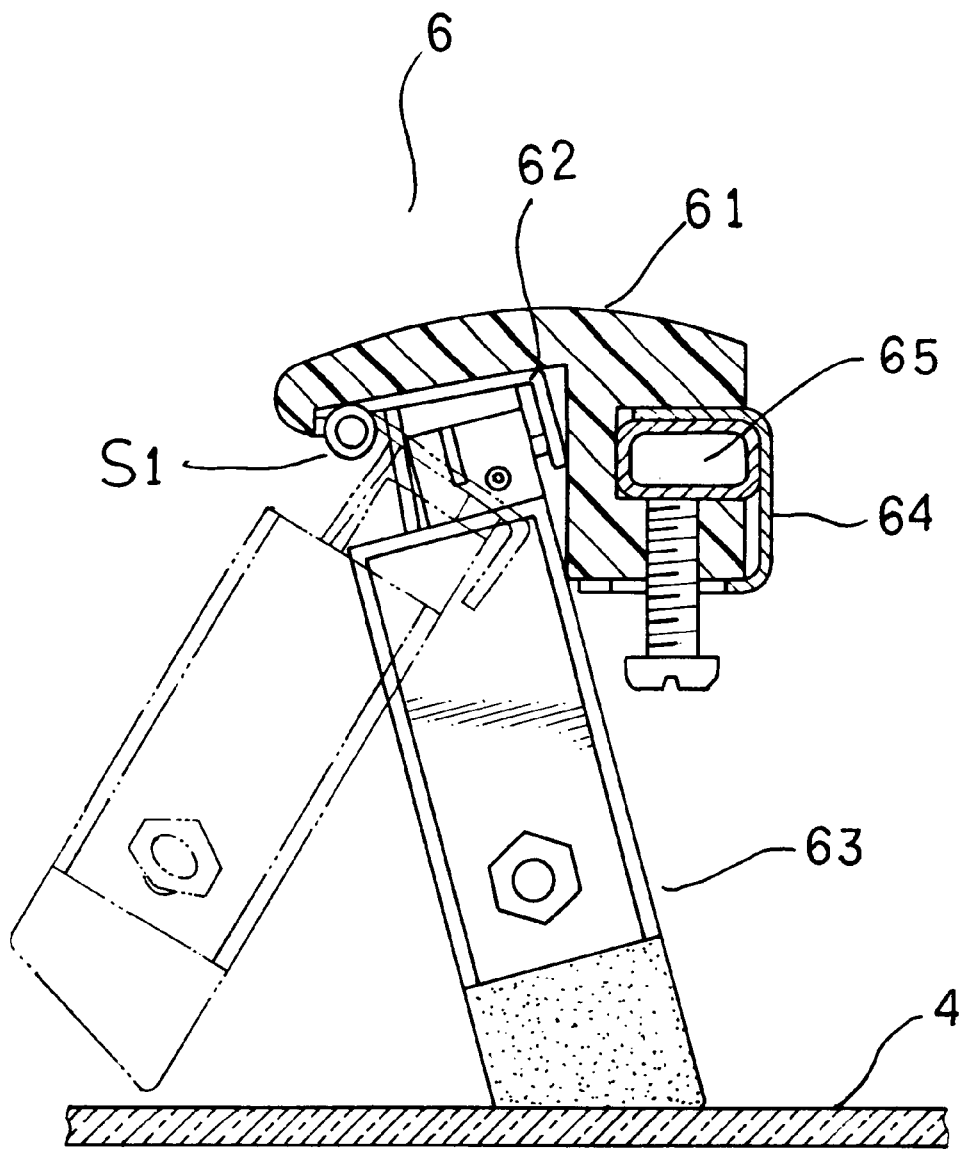
FIG. 6 is a schematic side cross-section view of a prior prop-up device of windshield wiper in use.

First please refer to FIG. 1, FIG. 2, and FIG. 3, the schematic views of a preferred embodiment in accordance with the present invention.

The automatic prop-up device of windshield wiper in accordance with the present invention, mainly comprises two major parts, a roller device 1 and a wedge device 2, wherein:

The roller device 1 is fixed onto the supporting pole 31 of the windshield wiper device 3, and the roller device 1 further comprises:

A body 11, the body 11 comprises a clamping trough 111 and a washer-clamping trough 112, wherein the clamping trough 111 can be encased onto the supporting pole 31 of the windshield wiper device 3 and a washer 13 with a screw hole 131 can be placed into the washer-clamping trough 112. The separation board of the two troughs 111, 112 further includes a hole 116. In addition, there is a sideboard 113 with plural parallel teeth-shape grooves 114 extended out from the bottom of the body 11, and at the mid-section of the sideboard 113 further includes an elongate hole 115.

A top pole 12, a long flat stick, includes a roller 121 at the lower rim and the inner surface includes plural parallel teeth-shape grooves 123 that are matched with the teeth-shape grooves 114 on the side board 113 of the body 11. At the mid-section of the top pole 12, it further includes an elongate hole 122 to allow a screw being inserted into the elongate hole 122 and the elongate hole 115 of the sideboard 113, so the top pole 12 and the sideboard 113 of the body 11 are connected by screwing a nut 17 tightly.

A washer 13, which can be set into the washer-clamping trough 112 of the body 11, includes a screw hole 131 to allow a screw 15 to go through and locked.

A clamping board 14, a ⊏ shape object, includes a hollow interior space 141 whose top board 142 can be set into the clamping trough 111 of the body 11 and encased onto the supporting pole of windshield wiper 31 while the bottom board 143 is tightly against the bottom of the body 11, and at the center of the bottom board 143 further includes a hole 144 for a screw 15 to be inserted. After being inserted through the screw hole 131 of the washer 13 and the hole 116 on the body 11 in sequence, the front end of screw 15 is tightly against the supporting pole of windshield wiper 31.

The wedge device 2 is constituted of a board with slopping top, and the slopping top can be either a flat-surface slope or a arc-surface slope. The wedge device 2 can be stuck onto the lower rim of the windshield glass 4 of a vehicle and is corresponding to the bottom of the roller device 1 (as shown in FIG. 2 and FIG. 3).

When the windshield wiper of a vehicle swings to the near lowest position (the stopping point when the windshield wiper stops swinging), the present invention comprises corresponding roller device 1 and wedge device 2 at the positions of the supporting pole 31 of the windshield wiper device 3, the lower rim of the windshield glass 4 of a vehicle, or where the windshield glass 4 connected to the hood 5. When the windshield wiper device 3 swings, it brings the roller device 1 and the wedge device 2 to make opposite movements, so when the windshield wiper device 3 swings to the lowest position or stops swinging, the roller device 1 moves upwards along the wedge device 2 and the rubber strip 32 of the windshield wiper device 3 is automatically raised to separate the rubber strip 32 and the windshield glass 4 (as shown in FIG. 2). The rubber strip 32 of the windshield wiper device 3 is able to avoid being damaged caused by contacting against the windshield glass 4 for a long period of time under sunshine and high heat, or freezing ice and dust accumulation, which prolongs the usage life of the rubber strip 32 of the windshield wiper device 3.

Summarized from the descriptions stated above, the present invention comprises corresponding roller device 1 and wedge device 2 at positions of the supporting pole 31 of the windshield wiper device 3, the lower rim of the windshield glass 4 of a vehicle, and where the windshield glass 4 connected to the hood 5. Through the opposite movements of the roller device 1 and the wedge device 2, the rubber strip 32 of the windshield wiper device 3 is automatically propped up so that the rubber strip 32 is separated from the windshield glass 4 when the windshield wiper device 3 swings to the lowest position or stops swinging to prolong the usage life of the rubber strip 32 of the windshield wiper device 3. Therefore the present invention provides an effective improvement of the prior art and meets all the necessary patent requirements.

While the present invention has been particularly shown and described with reference to a preferred embodiment, it will be understood by those skilled in the art that various changes in form and detail may be without departing from the spirit and scope of the present invention.

I claim:

1. An automatic prop-up device of windshield wiper mainly comprises two major parts, a roller device and a wedge device, wherein:

said roller device, fixed onto a supporting pole of a windshield wiper device, and said roller device further comprises:
a body, comprising a pole-clamping trough and a washer-clamping trough, wherein said pole-clamping trough can be encased onto said supporting pole of said windshield wiper device and a washer with a screw hole can be placed into said washer-clamping trough, wherein a separation board of said pole-clamping trough and said washer-clamping trough further includes a hole, and a sideboard with plural parallel teeth-shape grooves extended out from a bottom of said body and at the mid-section of said sideboard further includes an elongate hole;
a top pole, shaped as a long flat stick, including a roller at a lower rim, wherein an inner surface of said top pole includes plural parallel teeth-shape grooves that are matched with said teeth-shape grooves on said sideboard of said body, and at the mid-section of said top pole further includes an elongate hole to allow a screw being inserted into said elongate hole and said elongate hole of said sideboard to connect said top pole and said sideboard of said body by screwing a nut tightly;
a washer, which can be set into said washer-clamping trough of said body, including a screw hole to allow a screw to go through and locked; and
a clamping board, shaped as a ⊏ shape object, including a hollow interior space with a top board which can be set into said clamping trough of said body and encased onto said supporting pole of windshield wiper while a bottom board thereof is tightly engaged against the bottom of said body, and at the center of said bottom board further including a hole for said screw to be inserted, wherein a front end of said screw is tightly engaged against said supporting pole of windshield wiper after being inserted through said screw hole of said washer and said hole of said body in sequence; and said wedge device, constituted of a board with slopping top which can be either a flat-surface slope or a arc-surface slope.

* * * * *